United States Patent [19]

Cooper, Jr. et al.

[11] Patent Number: 4,683,109

[45] Date of Patent: Jul. 28, 1987

[54] DEBRIS REMOVAL SYSTEM FOR A NUCLEAR FUEL ASSEMBLY

[75] Inventors: Frank W. Cooper, Jr., Monroeville; George F. Dailey, Plum Boro., both of Pa.

[73] Assignee: Westinghouse Electric Corp., Pittsburgh, Pa.

[21] Appl. No.: 703,008

[22] Filed: Feb. 19, 1985

[51] Int. Cl.[4] .................................. G21C 19/00
[52] U.S. Cl. .................................... 376/261; 376/245; 376/258; 376/310; 81/57.5; 29/42; 15/21 R
[58] Field of Search .......................... 376/260–262, 376/249, 245, 251, 309, 310, 258; 81/57.5, 57.24; 29/723, 42; 408/35; 409/212, 213; 15/21 R

[56] References Cited

U.S. PATENT DOCUMENTS

| | | | |
|---|---|---|---|
| 4,196,049 | 4/1980 | Burns et al. | 376/249 |
| 4,311,556 | 1/1982 | Iwamoto et al. | 376/249 |
| 4,421,715 | 12/1983 | Gunter et al. | 376/260 |
| 4,428,903 | 1/1984 | Kasik et al. | 376/261 |
| 4,452,753 | 6/1984 | Wentzell et al. | 376/260 |
| 4,482,520 | 11/1984 | Randazza | 376/261 |
| 4,483,205 | 11/1984 | Bellaiche et al. | 376/310 |
| 4,487,741 | 12/1984 | Vuckovich et al. | 376/271 |
| 4,499,046 | 2/1985 | Castrec et al. | 376/249 |
| 4,512,380 | 4/1985 | Schmidt | 408/35 |

Primary Examiner—Deborah L. Kyle
Assistant Examiner—Daniel Wasil
Attorney, Agent, or Firm—L. A. DePaul

[57] ABSTRACT

A system for removing debris from a nuclear fuel assembly includes a work platform disposable on the fuel assembly racks in a spent fuel pol. A support stand is mounted on the work platform and has a sliding support plate movable between a support position engageable with the lower end of the fuel assembly, and a retracted position permitting lowering of the fuel assembly through an opening in the work platform into one of the racks. A tool manipulation assembly is disposable on the platform and includes a rotatable turret-type tool mount carrying four different cleaning tools, including a pick, a brush, a water lance and a water-actuated tweezers. The tool manipulating assembly includes drive means for effecting X-Y-Z movement of the tool mount for working on the fuel assembly. Each tool is resiliently mounted in a tool holder which yields if the tool engages the fuel assembly in a given direction with a predetermined force, generating an alarm signal to prevent damage to the tool assembly. The turret mount is indexible among four positions and is yieldably held in each to prevent harmful side loading of the fuel assembly. Counterweighting permits vertical movement of the tool mount with minimal forces.

26 Claims, 23 Drawing Figures

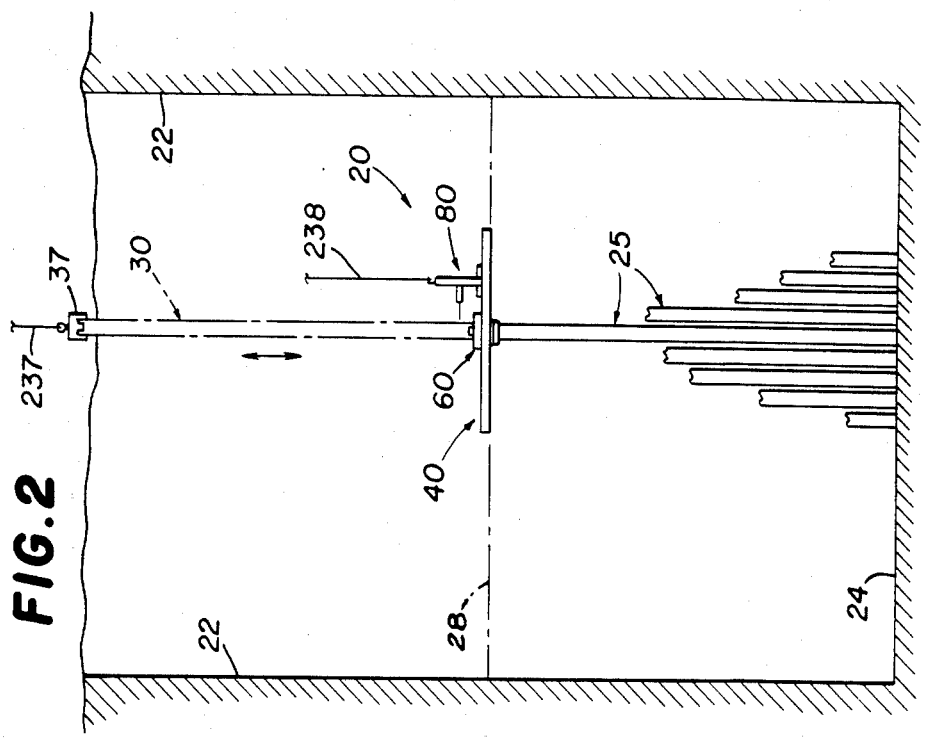
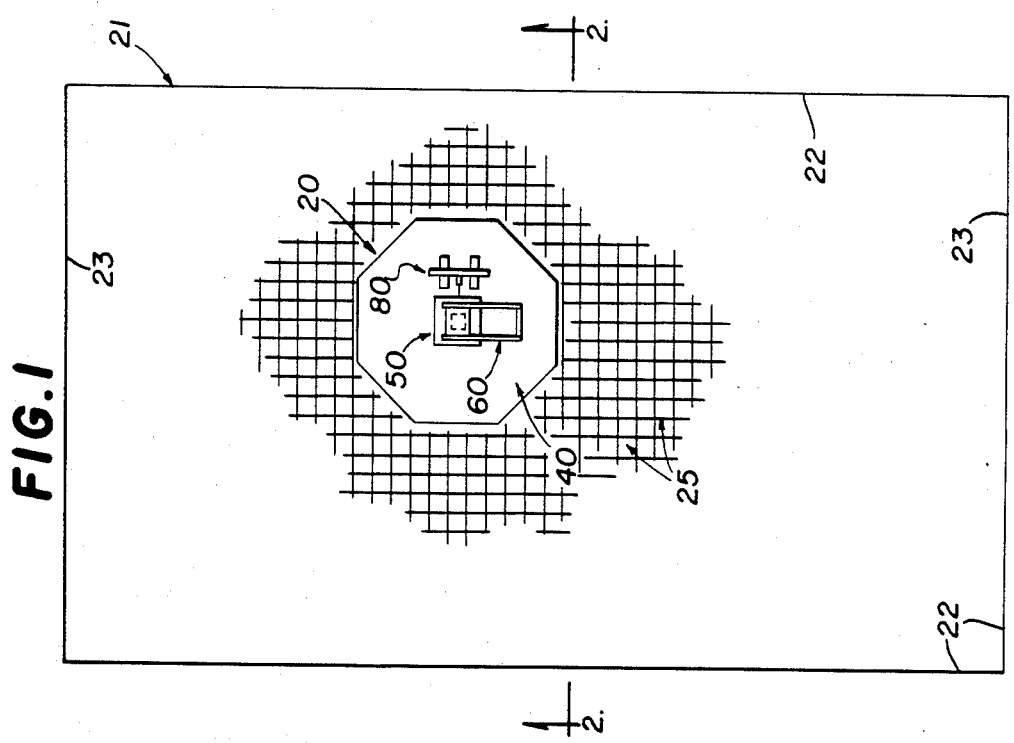

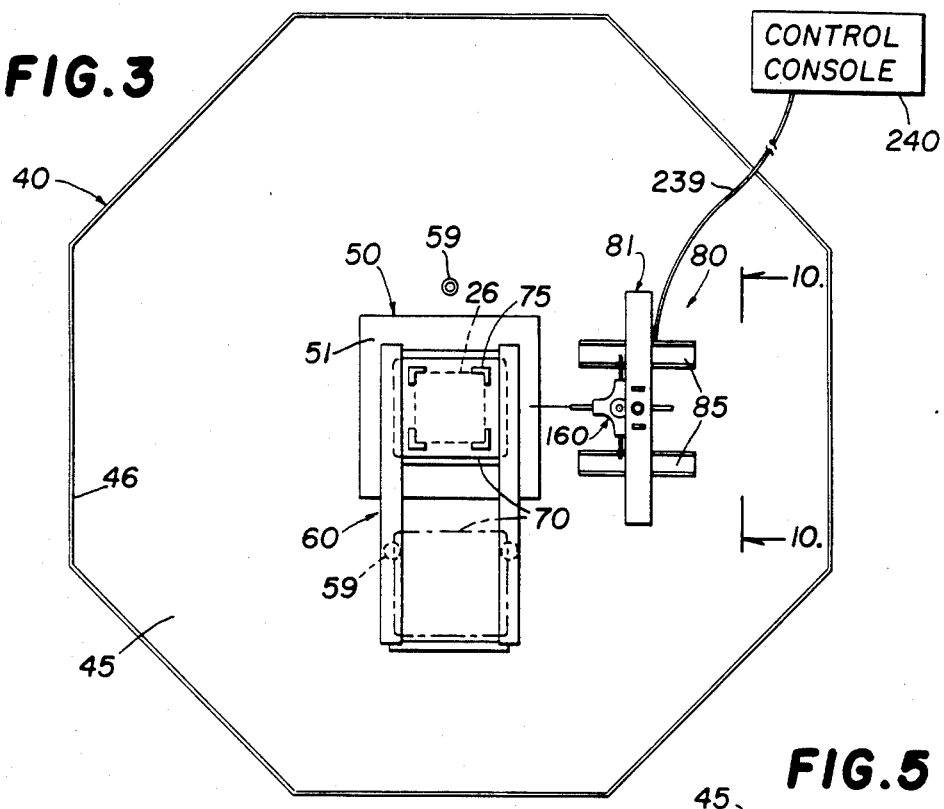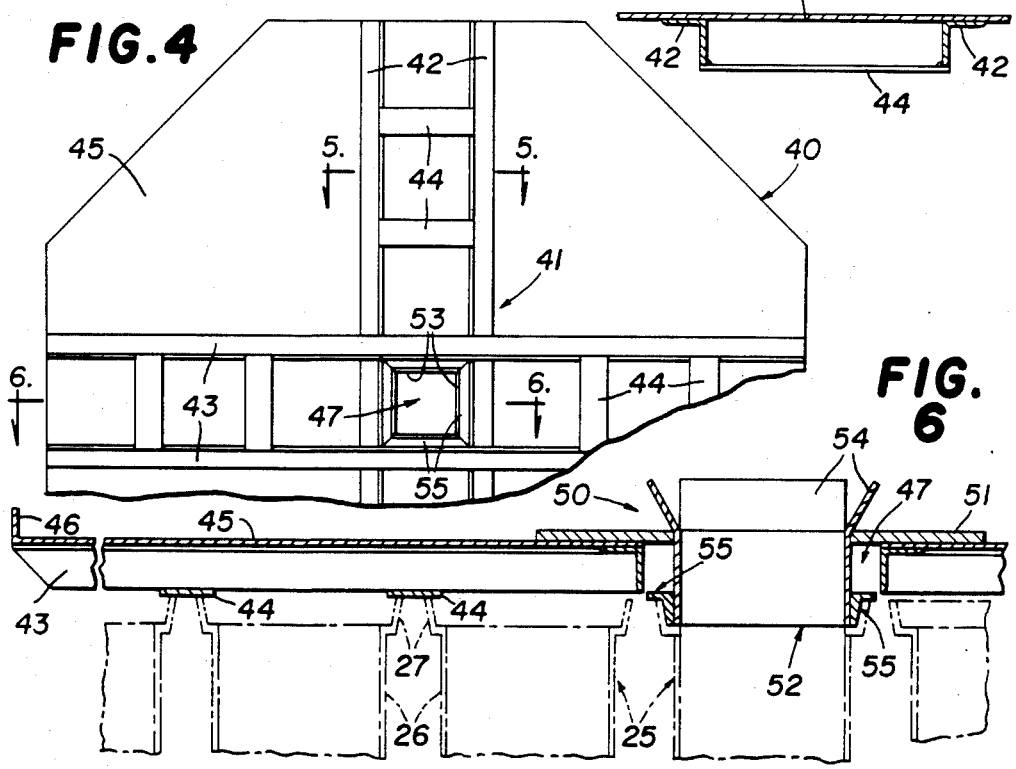

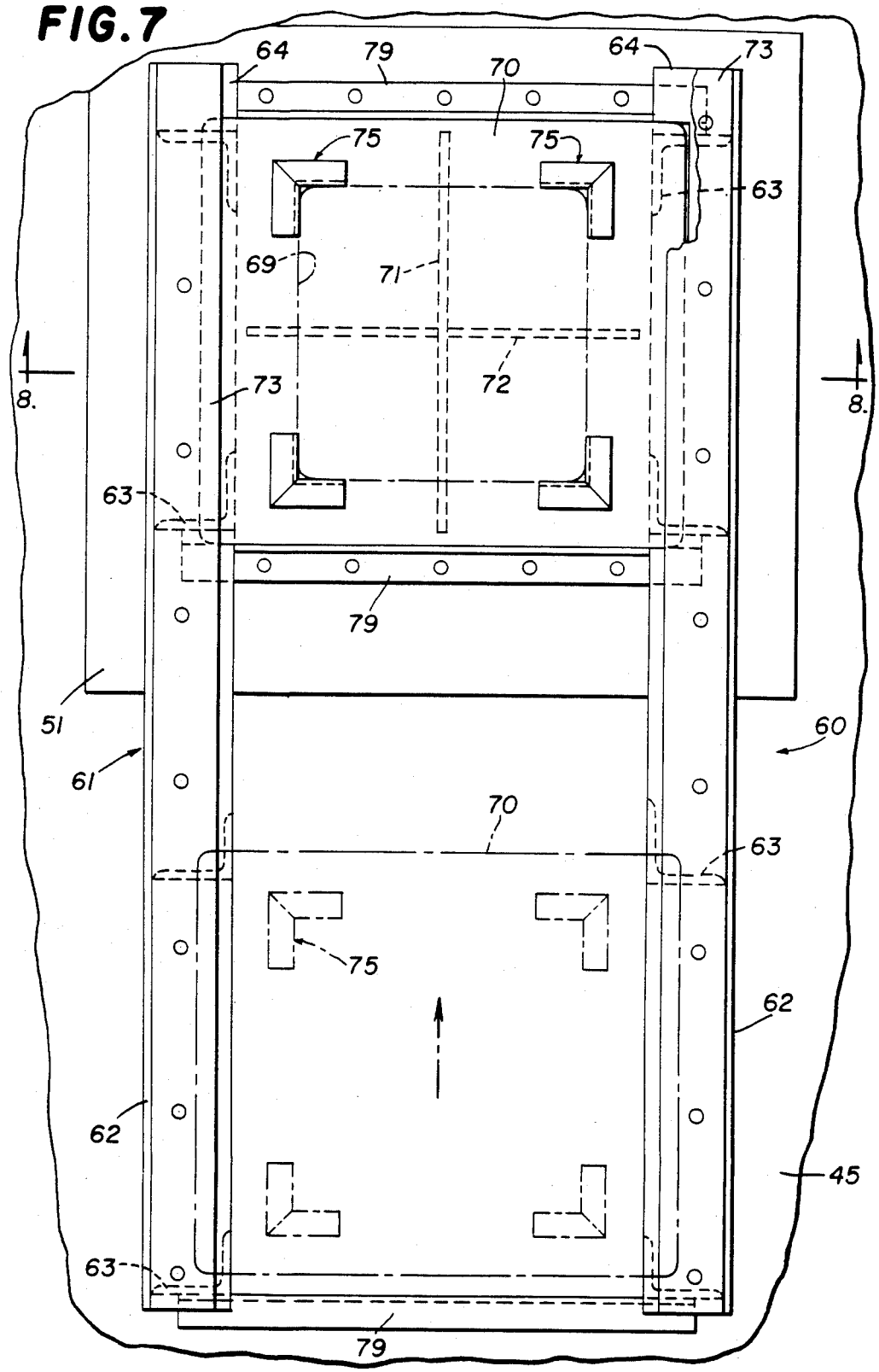

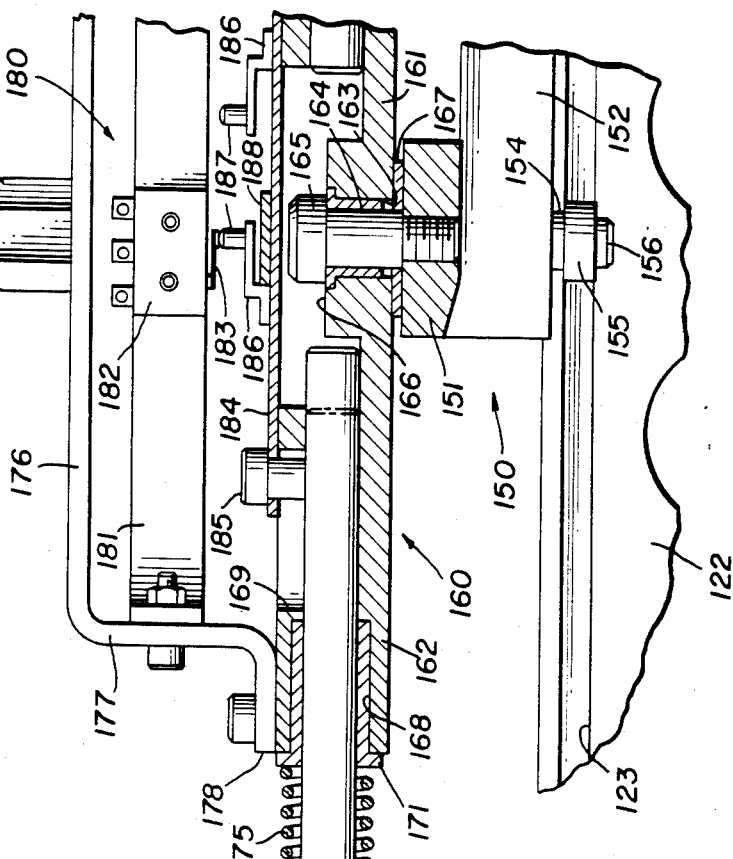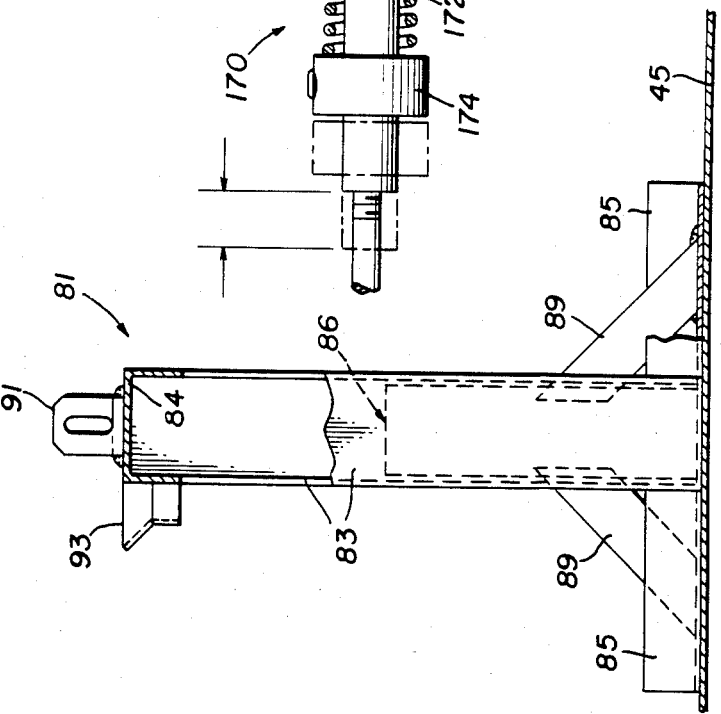

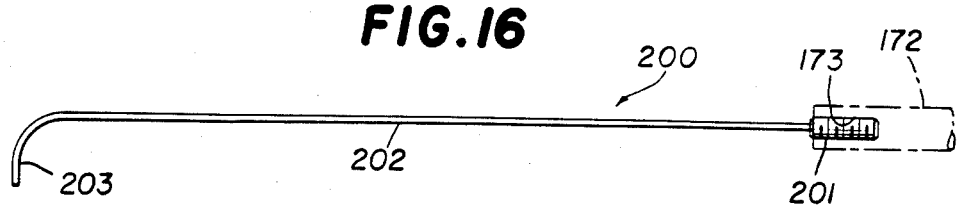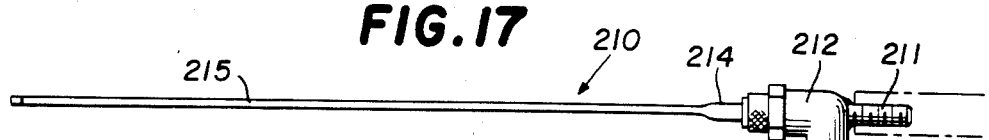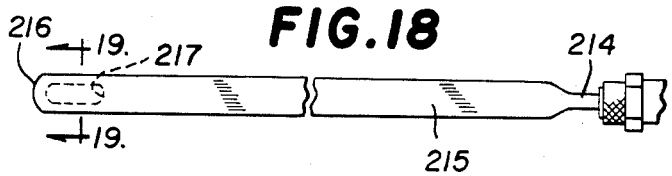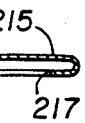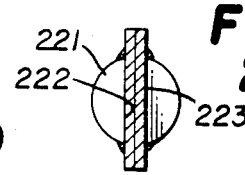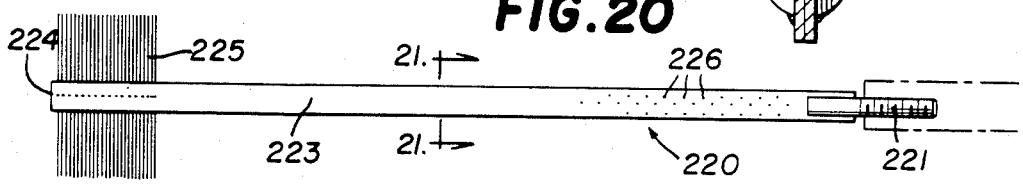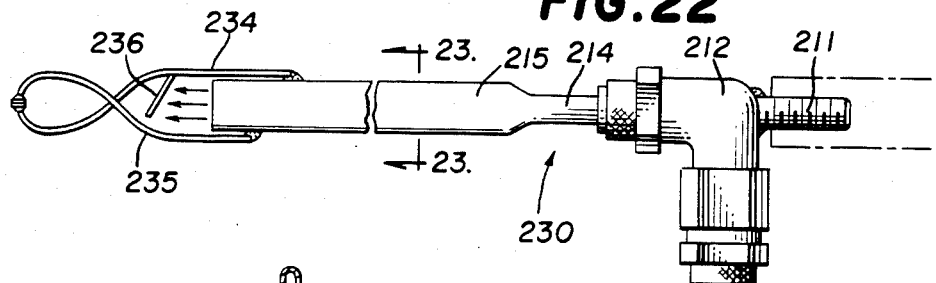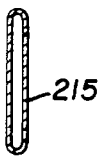

DEBRIS REMOVAL SYSTEM FOR A NUCLEAR FUEL ASSEMBLY

BACKGROUND OF THE INVENTION

1. Field of the Invention

The present invention relates to tool manipulation apparatus which permits the remote manipulation of tools with respect to an object to be worked on. The invention has particular application to apparatus for cleaning debris from the fuel assemblies of a pressurized water nuclear reactor.

2. Description of the Prior Art

Conventional pressurized water nuclear reactor fuel assemblies comprise a plurality of elongated fuel rods and control guide thimble tubes held in an organized array by grids spaced along the fuel assembly length. Top and bottom nozzles at opposite ends of the fuel assembly are secured to the thimble tubes, which extend above and below the ends of the fuel rods. The spacing between the fuel rods is relatively small, typically less than ¼ inch, and during installation and operation, the small spaces between the grid straps and the fuel rods acts as a filter which serves to trap debris carried in the primary coolant. This debris has been found to include metal chips, pieces of wire, and other unidentified metallic fragments, and usually becomes lodged between the first grid of the fuel assembly and the bottom nozzle adapter plate.

It has been found that such fuel assemblies have experienced a relatively significant number of cladding failures, i.e., leaking fuel rods, caused in part by the accumulation of debris. Once the debris is trapped, coolant flow can cause the debris to vibrate against the fuel rod and fret a hole in the cladding. Accordingly, it is necessary to remove such debris when it accumulates in the fuel assembly.

Heretofore, this debris removal operation has been effected manually. More specifically, the fuel assembly is suspended under water, such as in a spent fuel pool. Workmen stationed above the pool then manually attempt to remove debris, utilizing tools on the end of long poles or rods which are manually extended down to the desired position on the fuel assembly. Remote video cameras may be used to assist this operation, but it is still an extremely time consuming and difficult procedure, which depends entirely on the skill of the workmen. The changing of tools requires complete withdrawal of the tool and rod from the pool. Also, the manual procedure involves considerable man-rem exposure. Furthermore, there is considerable risk of damage to the fuel assembly, since it is extremely difficult to judge the force being applied to the fuel assembly when the tool comes in contact therewith, not to mention the difficulty of accurately positioning a tool manually at a distance of about 30 feet under water.

SUMMARY OF THE INVENTION

It is a general object of the present invention to provide an improved debris removal system which avoids the disadvantages of prior manual techniques, while affording additional structural and operating advantages.

An important object of the invention is the provision of a tool manipulation system which can be remotely operated with respect to a nuclear fuel assembly and minimizes man-rem exposure.

It is another object of the invention to provide a tool manipulation system of the type set forth, which permits the manipulation of any of a plurality of tools under remote control.

In connection with the foregoing objects, it is another object of the invention to provide a tool manipulation system of the type set forth, which permits accurate control of the movement of the tools and which effectively prevents damage to the nuclear fuel assembly being operated on.

Still another object of the invention is the provision of a tool manipulation system of the type set forth, which is relatively transportable and can be easily mounted and demounted in underwater locations.

Yet another object of the invention is the provision of a system for removal of debris from nuclear fuel assemblies, which includes a tool manipulation system of the type set forth.

These and other objects of the invention are attained by providing apparatus for manipulating tools with respect to a nuclear fuel assembly at a work station, the apparatus comprising: a transportable support movable to and from a work position at the work station adjacent to the nuclear fuel assembly, a tool carriage mounted on the support, a plurality of tools mounted on the tool carriage, the tool carriage including selection means accommodating disposition of a selected one of the tools in a work configuration with respect to the associated nuclear fuel assembly, motive means on the support for effecting movement of the tool carriage and the selected tool along any of three orthogonal axes for performing work with respect to the nuclear fuel assembly, and control means for remotely controlling operation of the motive means.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the intention, its construction and operation, and many of its advantages should be readily understood and appreciated.

FIG. 1 is a fragmentary top plan view of a spent fuel pool for nuclear fuel assemblies, in which the debris removal system of the present invention is mounted;

FIG. 2 is a fragmentary view in vertical section, taken along the line 2—2 in FIG. 1, and illustrating the position of a nuclear fuel assembly during operation thereon by the debris removal system of the present invention;

FIG. 3 is an enlarged top plan view of the debris removal system of the present invention;

FIG. 4 is a fragmentary bottom plan view of the debris removal system of FIG. 3;

FIG. 5 is a further enlarged fragmentary view in vertical section taken along the line 5—5 in FIG. 4;

FIG. 6 is a further enlarged fragmentary view in vertical section taken along the line 6—6 in FIG. 4;

FIG. 7 is a further enlarged fragmentary top plan view of the support stand of the present invention, with portions removed for clarity of illustration;

FIG. 14 is an enlarged, fragmentary view in vertical section, taken along the line 14—14 in FIG. 10, with portions broken away to show structural details;

FIG. 15 is a further enlarged fragmentary view of a portion of FIG. 11, illustrating operation of the yieldable tool holders of the present invention;

FIG. 16 is a side elevational view of one of the tools usable with the present invention;

FIG. 17 is a side elevational view of another tool usable with the present invention;

FIG. 18 is a fragmentary top plan view of another tool which is a modification of the tool of FIG. 17;

FIG. 19 is an enlarged view in vertical section taken along the line 19—19 in FIG. 18;

FIG. 20 is a side elevational view of another tool usable with the present invention;

FIG. 21 is an enlarged view in vertical section taken along the line 21—21 in FIG. 20;

FIG. 22 is an enlarged, fragmentary, side elevational view of another tool usable with the present invention; and FIG. 23 is a further enlarged view in vertical section taken along the line 23—23 in FIG. 22

DESCRIPTION OF THE PREFERRED EMBODIMENT

Figure 8:
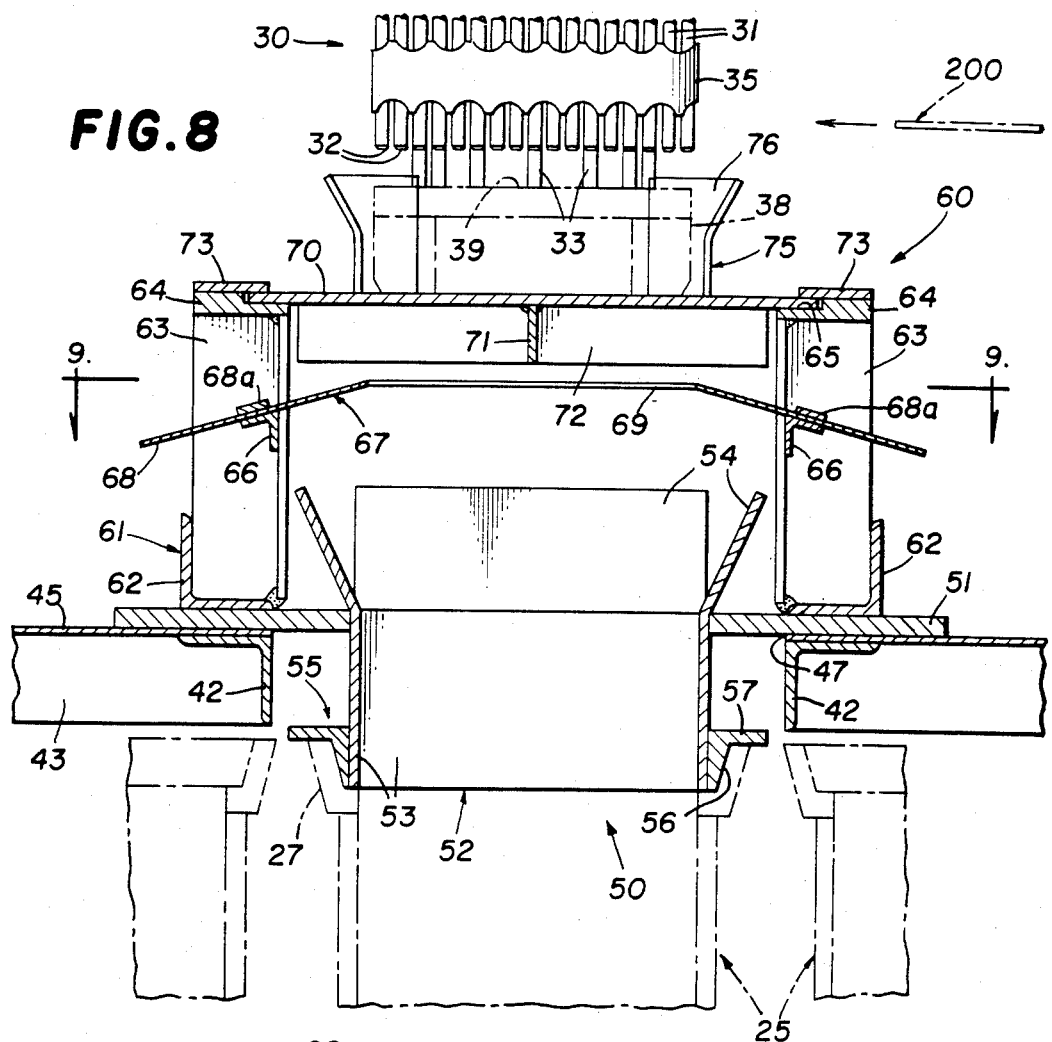
FIG. 8 is a fragmentary view in vertical section taken along the line 8—8 in FIG. 7, and illustrating the relationship of the support stand to an associated nuclear fuel assembly.
Figure 9:
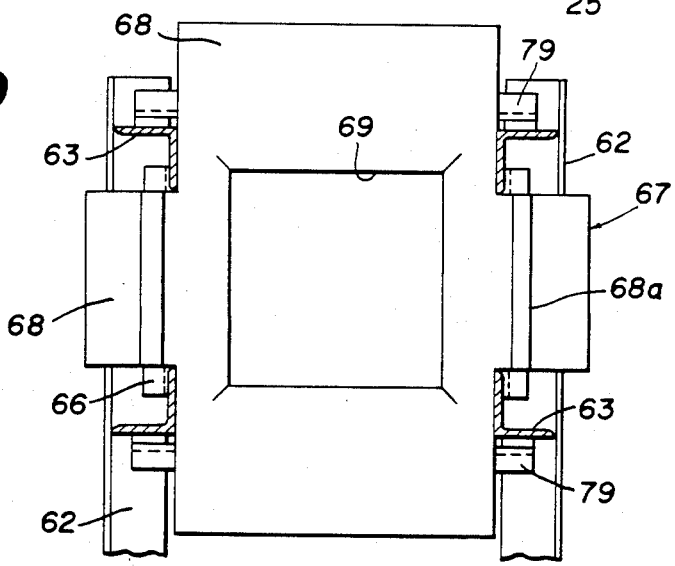
FIG. 9 is a reduced, fragmentary view in horizontal section taken along the line 9—9 in FIG. 8.

Referring to FIGS. 1 and 2, there is illustrated a debris removal system, generally designated by the numeral 20, constructed in accordance with and embodying the features of the present invention, and disposed for use in a spent fuel pool 21 of a nuclear power plant. The spent fuel pool 21 is generally rectangular and has vertical side walls 22, vertical end walls 23 and a bottom wall 24. Mounted on and substantially covering the bottom wall 24 are a plurality of fuel assembly racks 25, each being generally in the form of an elongated vertical tube substantially square in transverse cross section. Each rack 25 has four side walls 26, each provided at the upper end thereof with an outwardly flared flange 27 (see FIG. 6). The upper edges of the flanges 27 are substantially coplanar in a plan 28 (FIG. 2) and cooperate to form a square grid of racks 25, the inclination of the flanges 27 creating separating spaces between adjacent racks 25. Each of the racks 25 is dimensioned to accommodate a single nuclear fuel assembly 30, which may typically have a length of between 11 and 14 feet. In use, the spent fuel pool 21 is filled with water to a depth of between 40 and 50 feet. Thus, the plane 28 at the top of the fuel assembly racks 25 is typically disposed at least 30 feet below the surface of the water in the pool 21.

Referring to FIGS. 2 and 8, each nuclear fuel assembly 30 is a generally rectangular array of a plurality of elongated fuel rods 31, each having a bottom end plug 32, and a plurality of control rod guide thimble tubes 33. The thimble tubes 33 are somewhat longer than the fuel rods 31 and project predetermined distances above and below the ends thereof. The spacing between the fuel rods 31 and thimble tubes 33 is maintained by a plurality of longitudinally spaced-apart grid straps 35 (one shown). The fuel assembly 30 also includes a top nozzle 37 (FIG. 2) connected to the upper ends of the thimble tubes 33 and a bottom nozzle 38 connected to the lower ends of the thimble tubes 33, the bottom nozzle 38 having an upper surface 39 disposed at a slight distance (typically less than one inch) below the lower ends of the fuel rods 31.

In normal operation, spent fuel assemblies 30 are lowered, as by an overhead crane cable 237 and handling tool (not shown), into the pool 21 and into a selected one of the racks 25 for storage. It is an aspect of the present invention, that the spent fuel pool 21 is utilized for performing certain operations on a fuel assembly 30, in particular the removal of debris therefrom. In this regard, the debris removal system 20 includes a work platform 40, adapted to be mounted at the top plane 28 on the racks 25, a support stand 60, mountable on the work platform 40, and a tool manipulation assembly 80, which is also mountable on the work platform 40 adjacent to the support stand 60, as indicated in FIGS. 1 and 2. Thus, when a fuel assembly 30 is suspended above the work platform 40, operations can be performed on it, as will be explained in greater detail below.

Referring now also to FIGS. 3–6, the work platform 40 has a generally cruciform frame 41, including a pair of elongated, parallel angle beams 42 and a pair of parallel angle beams 43, disposed substantially perpendicular to the beams 42 and securely fastened thereto, as by welding. Support pads 44 interconnect the lower ends of the vertical flanges of the angle beams 42, and similarly interconnect the angle beams 43 to form a rigid framework, the support pads 44 being spaced apart longitudinally of the beams 42 and 43. A flat, octagonal deck 45 overlies and is fixedly secured to the horizontal flanges of the beams 42 and 43, which flanges are substantially coplanar. Integral with the deck 45 around its perimeter is a short upstanding flange 46. The deck 45 has a substantially square opening 47 therethrough centrally thereof, having dimensions slightly greater than the transverse dimensions of one of the fuel assembly racks 25, and being located at the intersection of pairs of beams 42 and 43. Respectively fixedly secured to the beams 43 and projecting upwardly therefrom through complementary openings in the deck 45 are a pair of locating pins 49 (see FIG. 10), for a purpose to be explained more fully below.

Referring to FIGS. 6 and 8, there is mounted on the work platform 40 a guide fixture 50, which includes a substantially square support plate 51 which overlies and is fixedly secured to the upper surface of the deck 45.

The support plate 51 has a square opening therethrough centrally thereof which is aligned in registry with the opening 47 in the deck 45. Fixedly secured to the support plate 51 within the opening therethrough and extending vertically downwardly therefrom is a square tube 52 dimensioned substantially the same as one of the racks 25. The tube 52 has four vertical walls 53, each provided at the upper end thereof with a laterally outwardly flared flange 54 which projects above the support plate 51. Four positioning members 55 are respectively fixedly secured to the outer surfaces of the walls 53 at the lower ends thereof. Each positioning member 55 is an angle member and includes an inclined guide surface 56 on the vertical flange thereof, and has a laterally outwardly extending horizontal bearing flange 57.

In use, the work platform 40 is lowered into position on the top of the racks 25, with the tube 52 of the guide fixture 50 in vertical alignment with a selected one of the racks 25. More particularly, the parts are positioned and arranged so that the walls 53 of the tube 52 will be respectively substantially coplanar with the walls 26 of the selected rack 25. The bearing flanges 57 will rest upon the upper edges of the flanges 27 of the selected rack 25, with the guide surfaces 56 in engagement with the inner surfaces of the flared flanges 27, this engagement serving to aid in guiding the tube 52 into accurate registry with the rack 25. The support pads 44 are positioned so that they will respectively rest upon the upper edges of the flanges 27 of two adjacent racks 25. Preferably, there are also provided on the work platform 40, three lifting lugs 59 (see FIG. 3), projecting upwardly from the deck 45 and adapted for engagement with a triangular lifting frame (not shown) to facilitate movement of the work platform 40, as by an overhead crane cable 238 (FIG. 2) to and from its work position on the racks 25. It can be seen that when the work platform 40 is mounted in this work position, illustrated in FIGS. 6 and 8, the guide fixture 50 serves accurately to guide an associated fuel assembly 30 into the selected rack 25, as will be explained in greater detail below. Referring now to FIGS. 3 and 7-9, the support stand 60 includes a generally rectangular frame 61, having a pair of elongated, parallel bottom rails 62. Fixedly secured to the bottom rails 62 and projecting vertically upwardly therefrom at longitudinally spaced-apart locations thereon are eight posts 63, four on each of the bottom rails 62. Preferably, the bottom rails 62 and the posts 63 are all right angle members. The posts 63 on each bottom rail 62 are interconnected at their upper ends by a corresponding one of a pair of beams 64, which respectively overlie the bottom rails 62. The upper surface of each of the beams 64 is provided along the inner edge thereof with a recessed bearing surface 65, which extends longitudinally of the beam 64 and terminates just short of the opposite ends thereof. There are also provided two acute angle support brackets 66, which respectively overlie the bottom rails 62 parallel thereto, with each bracket 66 interconnecting the two posts 63 closest to one end of the associated bottom rails 62, approximately midway along the vertical extent of the posts 63.

Mounted on the support brackets 66 is a non-metallic deflector shield 67, which may be formed of a suitable plastic, such as polypropylene. The deflector shield 67 is of generally cruciform shape, having four laterally outwardly extending and downwardly sloping tongues or arms 68, two of which overlie the support brackets 66 and are fixedly clamped thereto by clamp bars 68a, and the other two of which extend longitudinally between the bottom rails 62. The deflector shield 67 has a square opening 69 therethrough centrally thereof and dimensioned substantially the same as the transverse dimensions of a fuel assembly rack 25.

Mounted on the support stand 60 is a generally square sliding support plate 70, which has integrally secured to the bottom surface thereof, two perpendicularly intersecting stiffening ribs 71 and 72. The opposite side edges of the support plate 70 respectively rest upon the bearing surfaces 65 of the beams 64, in sliding engagement therewith. Two elongated rectangular retaining plates 73 are respectively fixedly secured to the upper surfaces of the beams 64 and extend the length thereof, the inner edges of the retaining plates 73 overlying the adjacent edges of the sliding support plate 70 for cooperation with the recessed bearing surfaces 65 to constrain the support plate 70 against vertical movement.

Mounted on the upper surface of the support plate 70 and projecting upwardly therefrom are four positioning corners 75, disposed generally at the corners of an imaginary square with the same dimensions as the opening 69 in the deflector shield 67. Each of the positioning corners 75 has an outwardly flared upper end 76. Two cross beam angles 79 extend transversely of the support stand 60 and interconnect the posts 63 which are interconnected by the support brackets 66. The longitudinally extending tongues 68 of the deflector shield 67 respectively overlie and rests upon the cross beams 79.

In use, the support plate 70 is slidably movable longitudinally of the support stand 60 between a supporting position, illustrated in solid line in FIG. 7, and a retracted position, illustrated in phantom in FIG. 7. When the support plate 70 is in its supporting position, the positioning corners 75 define the corners of the square which is substantially congruent and vertically aligned with the openings 69 in the deflector shield 67. In this position, the support plate 70 is adapted to receive thereon the lower end of a fuel assembly 30, this lower end being guided into position by the positioning corners 75, accurately and stably to retain the fuel assembly 30 in position on the support plate 70, as is indicated in FIG. 8. It will be appreciated that the fuel assembly 30 remains supported by the overhead crane, the support plate 70 serving merely to stabilize the position of the fuel assembly 30 in a vertical orientation. When the support plate 70 is disposed in its retracted position, it uncovers the opening 69 in the deflector shield 67 and the aligned guide fixture 50 and the underlying fuel assembly rack 25, thereby permitting the fuel assembly 30 to be lowered into the rack 25.

Figure 10:
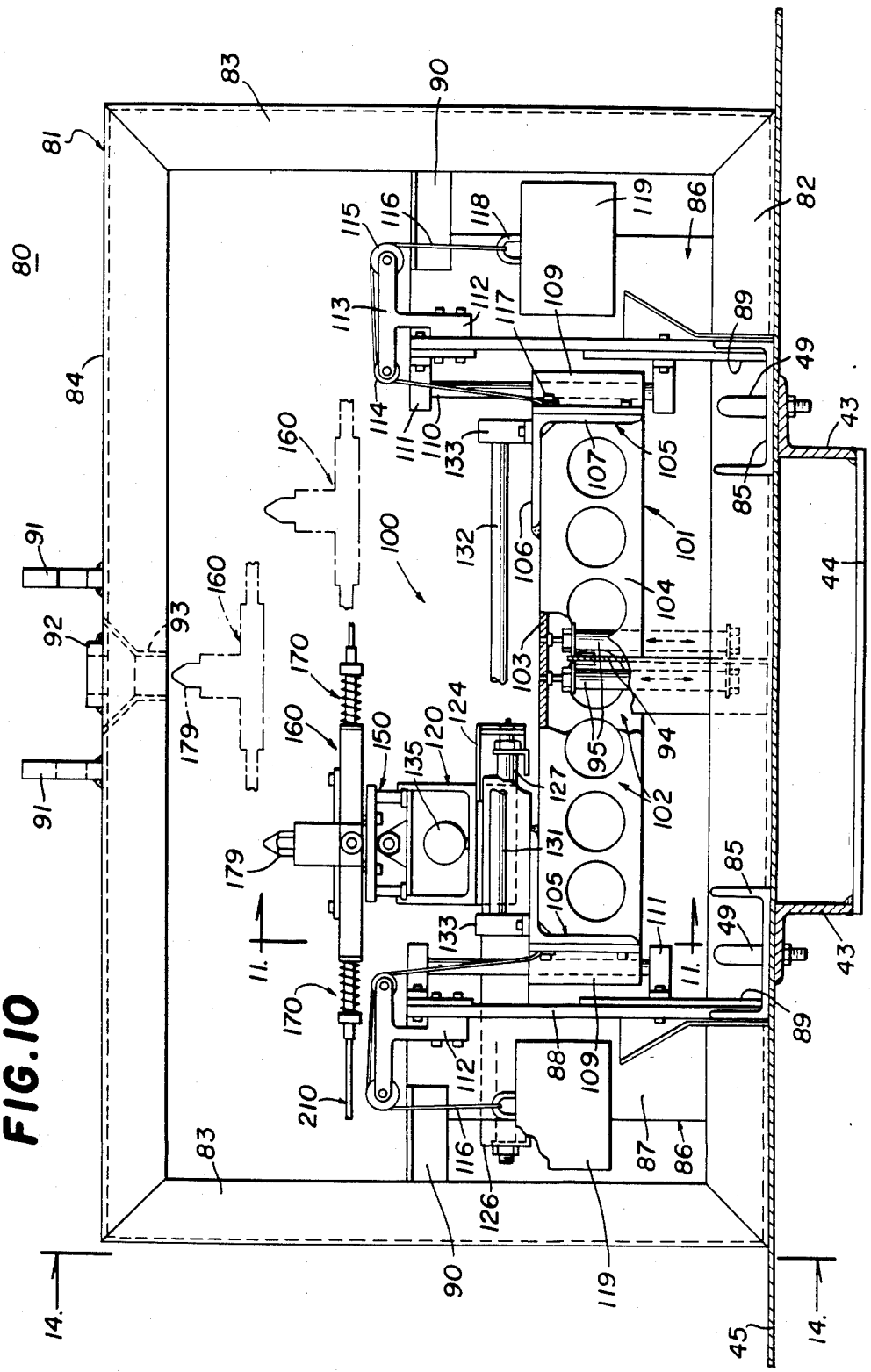
FIG. 10 is an enlarged, fragmentary view in vertical section taken along the line 10—10 in FIG. 3, and illustrating the tool manipulation assembly of the present invention in side elevation, with portions broken away more clearly to show the construction.

Referring now to FIGS. 3 and 10-15, the tool manipulation assembly 80 will be described. The tool manipulation assembly 80 includes a generally rectangular support frame 81, which resembles an open picture frame, and is comprised of an elongated base channel 82, a pair of upstanding post channels 83 and a head channel 84, best shown in FIG. 10. Fixedly secured to the base channel 82 and extending from opposite sides thereof perpendicular thereto are two spaced-apart pairs of foot channels 85 (FIGS. 10 and 14), which serve to stabilize the support frame 81. Respectively disposed adjacent to the two pairs of foot channels 85 and extending vertically upwardly therefrom within the support frame 81 are two mounting angles 86, which are arranged as mirror images of each other. Each of the mounting angles 86 has a flange 87, which is fixedly secured to one flange of the base channel 82 parallel thereto, and a flange 88 which is fixedly secured to one flange of the adjacent foot channel 85 parallel thereto. Each mounting angle 86 is provided with a pair of inclined braces 89 (FIGS. 10 and 14), which respectively extend from the two foot channels 85 of the adjacent pair thereof to the flange 88, and are fixedly secured to each, as by welding. The upper end of the flanges 87 are respectively coupled to the adjacent post channels 83 by two horizontally extending brace angles 90 (FIG. 10).

Fixedly secured to the top of the head channel 84 intermediate the ends thereof are two spaced-apart, upstanding lifting lugs 91. Disposed on the head channel 84 between the lifting lugs 91 is an annular rig pad 92, which is aligned with a complementary opening through the head channel 84. Fixedly secured to the head channel 84 and projecting downwardly therefrom between the lifting lugs 91 is a funnel 93.

Mounted on the support frame 81 is a drive assembly 100 (FIG. 10), which operates to effect an "X-Y-Z" movement of an associated tool, i.e., movement along any of three orthogonal axes. For purposes of illustration, the "Z" direction will be considered to be the vertical direction, the "X" direction will be considered to be the horizontal direction parallel to the plane of the support frame 81, i.e., parallel to the direction of elongation of the base channel 82, and the "Y" direction will be considered to be the horizontal direction perpendicular to the plane of the support frame 81. Also, the side of the support frame 81 which faces the support stand 60, i.e., the side on which the funnel 93 is mounted, will arbitrarily be considered to be the front or forward side of the tool manipulation assembly 80, while the opposite side will be considered to be the back or rearward side.

The drive assembly 100 includes a mounting angle 94 (FIGS. 10 and 11) which is fixedly secured to the base channel 82 intermediate the foot channels 85 and extends vertically upwardly therefrom. Two vertically disposed drive cylinders 95 are respectively disposed on opposite sides of one of the flanges of the mounting angle 94 and are fixedly secured thereto, as by mounting brackets 96. The cylinders 95 respectively have piston rods 97 which project vertically upwardly therefrom and are secured to a lift frame 101 for effecting vertical reciprocating movement thereof. More particularly, the lift frame 101 is a generally rectangular configuration of angle members, including a pair of parallel angle side beams 102, each having a horizontally disposed flange 103 and a vertically disposed flange 104, and a pair of angle end beams 105, each having a horizontally disposed flange 106 and a vertically disposed flange 107, the beams 102 and 105 being fixedly secured together, as by welding. The piston rods 97 are fixedly secured to the horizontal flange 103 of one of the side beams 102.

Two vertically oriented pillow blocks 109 are respectively fixedly secured to the outer surfaces of the vertical flanges 107 of the end beams 105. The pillow blocks 109 respectively receive therethrough two guide shafts 110. Each shaft 110 is supported by two shaft hangers 111 fixedly secured to the upper and lower ends thereof, the shaft hangers 111 in turn being securely mounted on the flange 88 of the adjacent one of mounting angles 86. The pillow blocks 109 are freely slidable along the guide shafts 110 for guiding the vertical movement of the lift frame 101, i.e., movement in the "Z" direction.

Also respectively fixedly secured to the flanges 88 of the mounting angles 86 adjacent to the upper ends thereof, are two pulley brackets 112. Each pulley bracket 112 has two arms 113 extending longitudinally of the support frame 81 and respectively rotatably carrying sheaves or pulleys 114 and 115 adjacent to the distal ends thereof. Two cables 116 are respectively associated with the pulley brackets 112. In particular, each cable 116 is trained over the pulleys 114 and 115 of the associated pulley bracket 112, the cable 116 having one end thereof secured by an anchor 117 to the adjacent end of the lift frame 101, and having the other end thereof secured, as by U-bracket 118, to an associated one of two counterweights 119. The counterweights 119 serve to counterbalance the lift frame 101 and the portions of the drive assembly 100 carried thereby, so as to minimize the force which must be exerted by the drive cylinders 95 to effect vertical movement of the lift frame 101.

Figure 11:
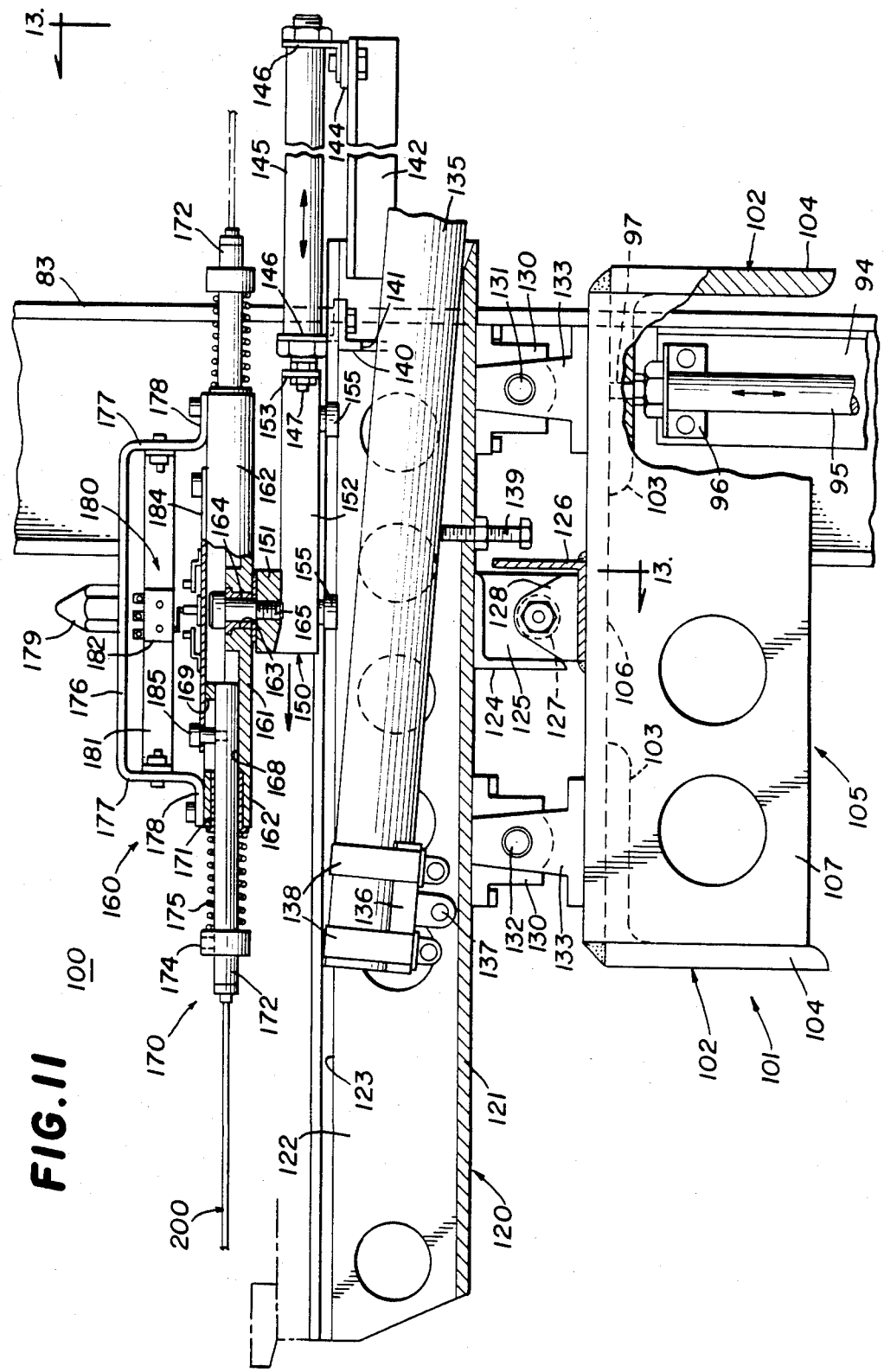
FIG. 11 is a further enlarged fragmentary view in vertical section, taken along the line 11—11 in FIG. 10, with portions broken away, more clearly to show the construction.
Figure 13:
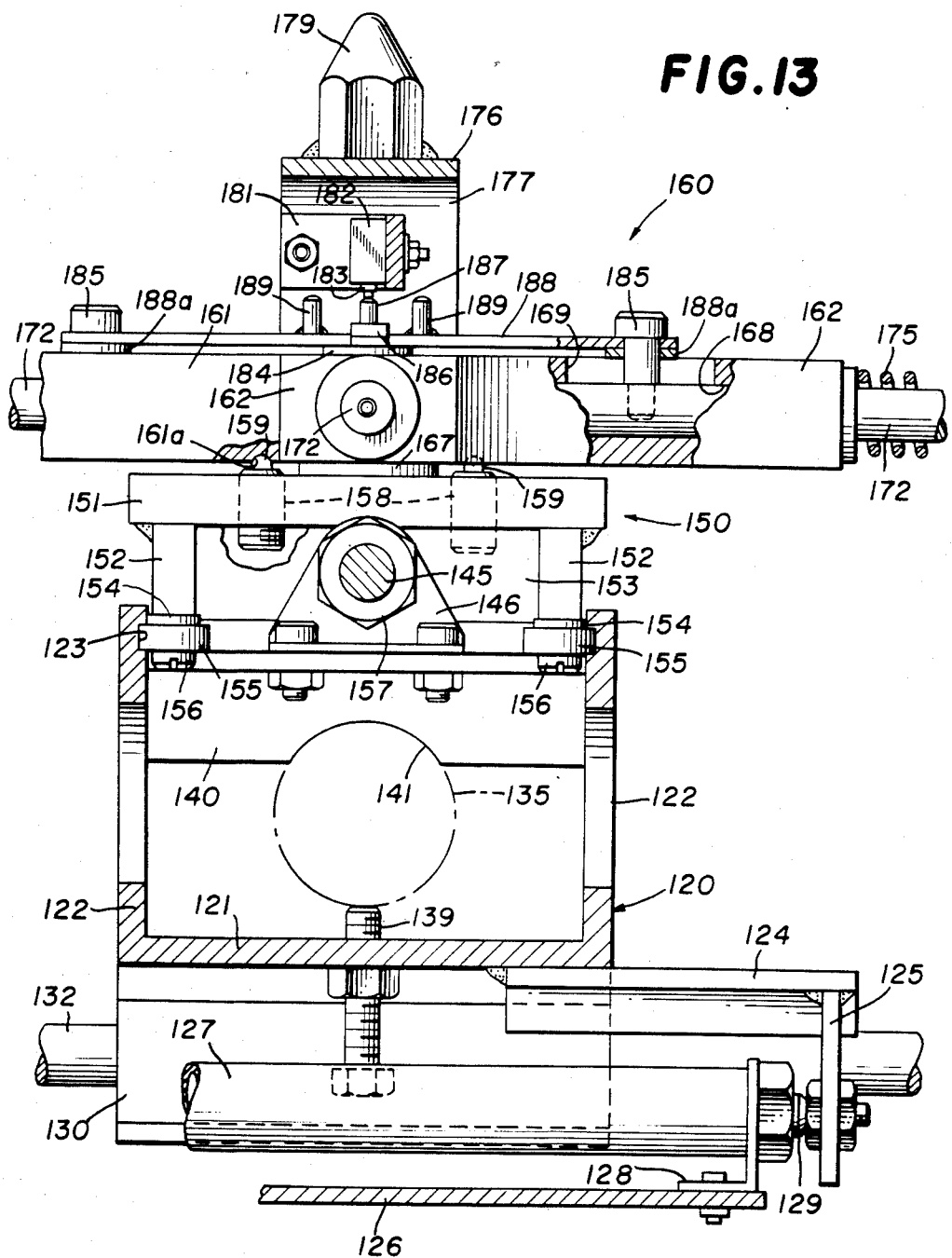
FIG. 13 is a further enlarged, fragmentary view in vertical section, taken along the line 13—13 in FIG. 11, with portions broken away to illustrate structural details.

Mounted on the lift frame 101 is a lateral frame 120, which is movable in the "X" direction, i.e., horizontally left and right, as viewed in FIG. 10. The lateral frame 120 is generally in the shape of an elongated channel having a rectangular bottom wall 121 and a pair of upstanding rectangular side walls 122. Each of the side walls 122 is provided on the inner surface thereof with an elongated groove 123 extending the length thereof adjacent to the distal edge thereof (FIGS. 11, 13 and 15). Fixedly secured to the bottom wall 121 of the lateral frame 120 intermediate the ends thereof, and projecting laterally therefrom perpendicular to the side walls 122, is an angle bracket 124, closed at the distal end thereof by a rectangular end plate 125. An elongated angle member 126 is secured to the horizontal flange 106 of one of the end beams 105 of the lift frame 101, the angle member 126 extending parallel to the side beams 102 substantially midway therebetween, and extending from adjacent the midpoint of the lift frame 101 outwardly therebeyond to a point near the adjacent one of the post channels 83. An elongated drive cylinder 127 is disposed along the angle member 126, being fixedly secured thereto by foot brackets 128, the cylinder 127 having a horizontal piston rod 129 extending from the inner end thereof and fixedly secured to the end plate 125.

Thus, it will be appreciated that the piston rod 129 is coupled to the lateral frame 120 for effecting reciprocating horizontal movement thereof to the left and right, as viewed in FIG. 10, with respect to the lift frame 101. This horizontal movement is guided by two pillow blocks 130 which are fixedly secured to the bottom wall 121 of the lateral frame 120 and are respectively disposed for sliding movement along guide shafts 131 and 132, each of which is supported at the opposite ends thereof by a pair of shaft hangers 133 which are fixedly secured to the horizontal flanges 106 of the end beams 105.

Disposed within the lateral frame 120 is an elongated video camera 135, having one end thereof seated in a saddle bracket 136, mounted for pivotal movement about a pivot pin 137 spanning the side walls 122 of the lateral frame 120. The camera 135 is secured to the saddle bracket 136 by a pair of clamps 138. An adjustment screw 139 extends through an opening in the bottom wall 121 of the lateral frame 120 for engagement with the camera 135 to adjust the inclination thereof for proper viewing of the portion of the fuel assembly 30 being worked on.

An angle bracket 140 spans the side walls 122 of the lateral frame 120 adjacent to the right-hand end thereof, as viewed in FIG. 11, above the camera 135. The vertical flange of the angle bracket 140 has an arcuate recess 141 therein to accomodate adjustment of the inclination of the camera 135. Also respectively fixedly secured to the side walls 122 and projecting rearwardly therefrom (to the right, as viewed in FIGS. 11 and 12) are two elongated angle members 142 and 143, interconnected at their distal ends by a cross bar 144. An elongated drive cylinder 145 is disposed between the angle members 142 and 143 parallel thereto, and has the opposite ends thereof secured, as by foot brackets 146, respectively to the angle bracket 140 and the cross bar 144. The cylinder 145 has a horizontal piston rod 147 which projects forwardly therefrom (to the left, as viewed in FIGS. 11 and 12).

Mounted on the lateral frame 120 is a longitudinal frame 150, which includes a support plate 151 spanning and secured to the upper edges of a pair of elongated, parallel side plates 152 at one end thereof, the side plates 152 being disposed substantially parallel to the side walls 122 of the lateral frame 120. The side plates 152 are interconnected at the other end thereof by a cross bar 153. The lower edges of the side plates 152 are spaced by spacers 154 from four roller bearings 155, two of the roller bearings 155 being disposed at spaced-apart locations along each of the side plates 152 and secured to the lower edges thereof by shoulder screws 156 (FIG. 13). The roller bearings 155 are freely rotatable on the shoulder screws 156 and are disposed for rolling engagement in the grooves 123 in the side walls 122 of the lateral frame 120. The piston rod 147 is coupled by nuts 157 to the cross bar 153. Thus, it will be appreciated that the cylinder 145 operates to effect a reciprocating horizontal sliding movement of the longitudinal frame 150 forwardly and rearwardly of the support frame 81 in the "Y" direction (to the left and right as viewed in FIGS. 11 and 12), with respect to the lateral frame 120.

Two plunger fittings 158 are respectively threadedly engaged in complementary bores in the support plate 151, each of the fittings 158 having an upwardly spring-biased plunger pin 159 engageable with a tool mount carriage 160. The tool mount carriage 160 comprises a turret plate 161 having four equiangularly spaced-apart recesses 161a in the bottom surface thereof (FIG. 13), arranged so that any two opposed ones thereof may respectively receive the plunger pins 159 therein. The turret plate 161 has four radially outwardly extending arms 162 respectively aligned with the recesses 161a. An axial bore 163 (FIG. 11) is formed vertically through the center of the turret plate 161 and is lined with a bushing 164. Received through the bushing 164 is a shoulder screw 165, the head of which is seated in a large circular recess 166 disposed centrally at the top surface of the turret plate 161. The shoulder screw 165 is threadedly engaged with the support plate 151 intermediate the ends thereof, the turret plate 161 being spaced from the support plate 151 by a spacing washer 167.

The turret plate 161 is rotable on the shoulder screw 165. The plunger pins 159 frictionally ride along the bottom surface of the turret plate 161 and seat in opposed ones of the recesses 161a when two opposed ones of the arms 162 are aligned in the "Y" direction, with the other two arms 162 aligned in the "X" direction parallel to the lateral frame 120, as illustrated in the drawings, this constituting a work configuration of the tool mount carriage 160. Thus, it will be appreciated that the tool mount carriage 160 is disposable in four work configurations in which, respectively, the four arms 162 project forwardly (to the left, as viewed in FIGS. 11 and 12) of the support frame 81 in the "Y" direction toward the associated fuel assembly 30 (see FIGS. 2 and 3). The engagement of the plunger pins 159 in the recesses 161a serves resiliently to hold the tool mount carriage 160 in the selected one of its work configurations, so as to prevent accidental movement of the tool mount carriage from that configuration, while accommodating ready indexing of the tool mount carriage 160 to another selected work configuration by the application of minimal rotational force.

Each of the arms 162 has a radial bore 168 formed at the distal end thereof, the inner end of each bore 168 communicating with the central recess 166. Each arm 162 also has formed in the upper surface thereof an elongated slot 169 which communicates with the radial bore 168, all for the purpose of respectively accommodating four tool holder assemblies 170 which are identical in construction, wherefore only one will be described in detail. Referring in particular to FIGS. 11–13 and 15, each tool holder assembly 170 includes a bushing 171 lining the distal end of the associated radial bore 168, and slidably coaxially receiving therein an elongated shaft 172. The shaft 172 has an internally threaded axial bore 173 in the outer end thereof (see FIG. 16). A collar 174 encircles the shaft 172 adjacent to its outer end, and may be secured in place, as by a set screw. Disposed in surrounding relationship with the shaft 172 and trapped between the bushing 171 and the collar 174 is a helical compression spring 175.

Mounted on top of the turret plate 161 is a generally bail-shaped bracket 176 having a pair of depending legs 177, each provided with an outturned attachment foot 178, the feet 178 being respectively fixedly secured by suitable fasteners to opposed ones of the arms 162. Mounted on top of the bracket 176 intermediate the ends thereof and projecting upwardly therefrom is a short hex stud 179, for use in rotating the tool mount carriage 160 among its several work configurations, as will be explained more fully below.

The tool mount carriage 160 also has an alarm assembly 180, which includes a generally bail-shaped strap 181 fixedly secured to and spanning the legs 177 of the bracket 176. Carried by the strap 181 intermediate the ends thereof is a limit switch 182 having a depending actuating lever 183 (FIGS. 13 and 15). An elongated metal strap 184 is aligned with two opposed ones of the arms 162 and spans the central recess 166 in the turret plate 161. Received through complementary openings in the strap 184 adjacent to its opposite ends are two shoulder screws 185, which respectively extend downwardly through the associated ones of the slots 169 in the arms 162 and are threadedly engaged respectively with the shafts 172 of the associated ones of the tool holder assemblies 170, adjacent to the inner ends thereof. The strap 184 carries two longitudinally spaced-apart clips 186, each carrying an upwardly projecting actuator pin 187.

Figure 12:
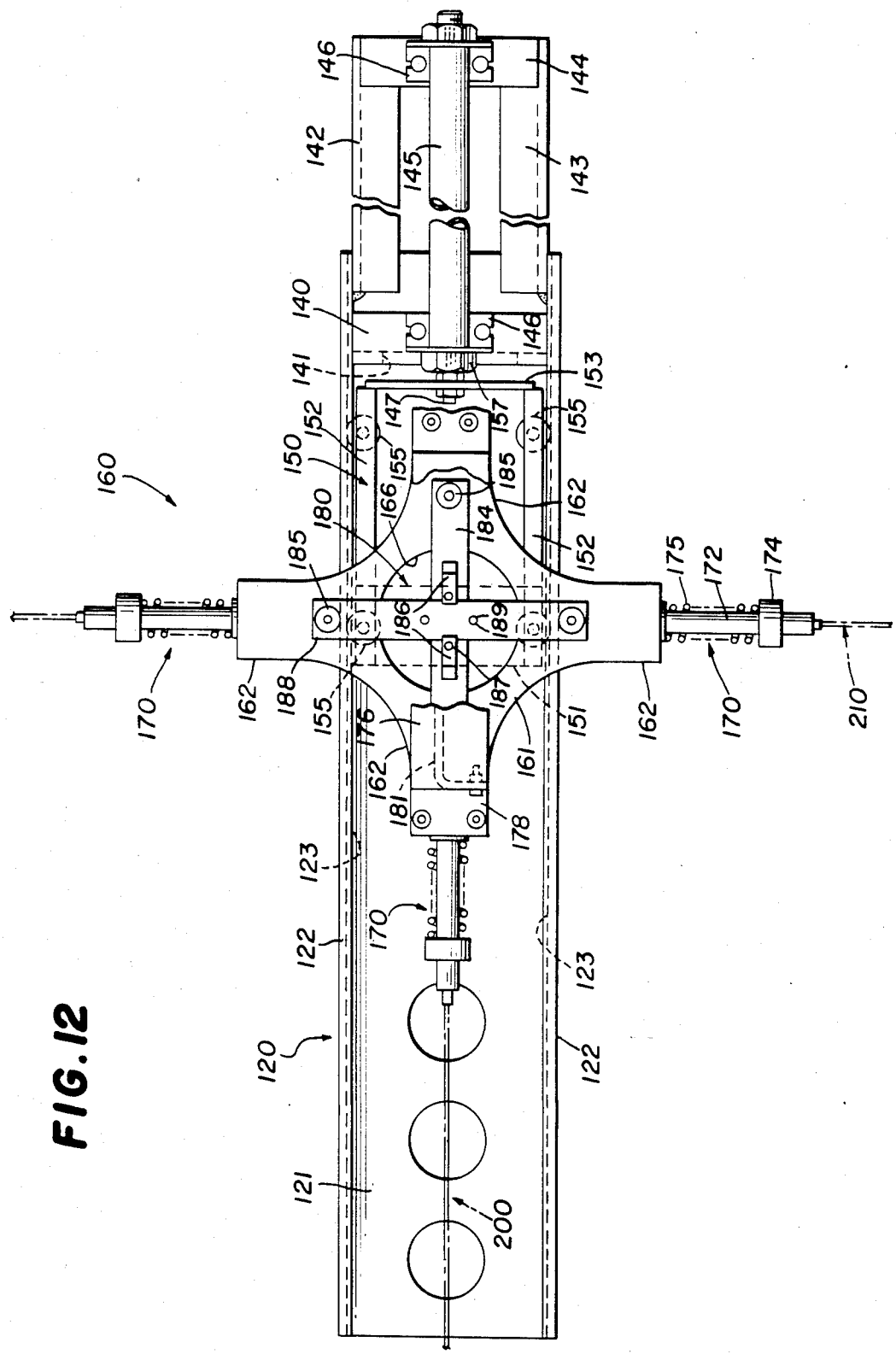
FIG. 12 is a top plan view of the portion of the tool manipulation assembly shown in FIG. 11, with portions broken away more clearly to shown the construction.

An elongated strap 188 overlies the strap 184 perpendicular thereto, being aligned with the other two arms 162. The ends of the strap 188 are spaced from the top surface of the arms 162 by spacers 188a (FIG. 13) to ensure clearance of the strap 184. Two of the shoulder screws 185 are received through complementary openings in the strap 188 and the spacers 188a and through the aligned ones of the slots 169, and are respectively threadedly engaged with the other two tool holder shafts 172 adjacent to the inner ends thereof. The strap 188 carries two longitudinally spaced-apart upstanding actuator pins 189 (FIGS. 12 and 13).

In operation, it will be appreciated that the strap 184 and its associated shoulder screws 185 and tool holder shafts 172 move horizontally as a unit, axially of the shafts 172. Similarly, the strap 188 and its associated shoulder screws 185 and tool holder shafts 172 move as a unit. The springs 175 of each such unit are balanced so as to resiliently urge the tool holder assemblies 170 thereof radially outwardly to extended conditions, illustrated in FIGS. 11 and 12, wherein the shoulder screws 185 are respectively centered in the associated slots 169. If a radially inwardly directed force is exerted on one of the tool holder assemblies 170, it moves the shaft 172 thereof radially inwardly, against the urging of the associated compression spring 175, to a retracted condition, illustrated in FIG. 15. It will be appreciated that this effects a corresponding movement of the strap 184 (or 188) and a radial outward movement of the aligned one of the tool holder shafts 172 on the opposite side of the tool mount carriage 160. When the parts reach the retracted position illustrated in FIG. 15, one of the actuator pins 187 (or 189) will engage the switch lever 183, actuating the limit switch 182 to generate a signal. Preferably, the length of the slots 169 is such that this signal will be generated before the shoulder screw 185 bottoms out at the end of the slot 169. The signal generated by the switch 182 may be an alarm to provide an indication that the shaft 172 is near the end of its retraction travel, or may be coupled to the drive assembly 100 for automatically terminating the movement thereof which occasioned the retraction of the tool holder assembly 170, as will be discussed further below.

The tool mount carriage 160 can simultaneously carry four different tools, a number of such tools useful for removing debris from a fuel assembly 30 being illustrated in FIGS. 16-23. In FIG. 16, there is illustrated a pick tool 200 (also indicated in FIG. 8), which includes an externally threaded mounting lug 201 adapted for threaded engagement in the axial bore 173 in any one of the tool holder shafts 172. Integral with the mounting lug 201 is an elongated rod or shaft 202 provided with a curved pick 203 at its distal end. This tool may be useful for picking lodged debris to free it from the fuel assembly 30.

In FIG. 17, there is illustrated a water lance tool 210 which includes a mounting lug 211 for mounting on a tool holder shaft 172. Integral with the mounting lug 211 is an elbow fitting 212, one end of which is coupled to a water conduit 213, which is in turn coupled to an associated source of pressurized, demineralized water (not shown). The other arm of the elbow fitting 212 is coupled to a hollow lance tube 214, which has an elongated flattened portion 215 open at its distal end. It will be appreciated that water fed through the fitting 212 is expelled from the distal end of the lance tube 214 for dislodging debris or washing away loose debris. The pressure of the stream of water emitted from the lance tube 214 is increased by reason of the reduced cross-sectional area of the flattened portion 215.

In FIGS. 18 and 19, there is illustrated a modified version of the water lance tool 210, wherein the distal end of the flattened portion 215 is welded or soldered shut, as at 216. The bottom of the flattened portion 215 is provided with an elongated opening 217 therein adjacent to the closed end 216. Thus, it will be appreciated that the water will be emitted through the opening 217 in a direction perpendicular to the longitudinal axis of the tool 210.

In FIGS. 20 and 21, there is illustrated a brush tool 220 which includes an externally threaded mounting lug 221 for mounting to the associated tool holder shaft 172. The mounting lug 221 is provided with an axial slot 222 in its outer end, in which is received a shaft 223, which comprises an elongated flat strap folded back upon itself, as at a fold 224, the free folded-together ends being received in the slot 222 and fixedly secured to the mounting lug 221, as by welding. A plurality of elongated bristles 225, which may be formed of metal, are trapped between the folds of the shaft 223 adjacent to the distal end thereof, and may additionally be secured in place by a suitable epoxy adhesive. The folded halves of the shaft 223 are secured together by a plurality of spot welds 226 along the length thereof, the spot welds 226 also serving to secure the bristles 225 in place. Preferably, the bristles 225 have a length so that they can simultaneously brush the lower ends of the fuel rods 31 and the upper surface 39 of the fuel assembly bottom nozzle 38.

In FIGS. 22 and 23, there is illustrated a tweezers tool 230, which is another modification of the water lance tool 210. More specifically, two pincer arms 234 and 235 are respectively fixedly secured, as by soldering or welding, to the opposite edges of the flattened portion 215 of the lance tube 214, adjacent to the distal end thereof. The pincer arms 234 and 235 are curved, so that their distal ends are disposed for opposing engagement with each other. Normally, the pincer arms 234 and 235 are biased so that the distal ends thereof are spread apart. Integral with the pincer arm 234 and projecting therefrom toward the pincer arm 235 is an inclined vane 236, which is disposed across the distal end of the lance tube 214 in the path of the jet of water emitted therefrom. When a stream of water is ejected from the lance tube 214, in strikes the vane 236, driving the pincer arm 234 upwardly to a closed condition, wherein its distal end is in clamping engagement with the distal end of the other pincer arm 235, as illustrated in FIG. 22. When the water jet is turned off, the tweezers tool 230 is reopened. It will be appreciated that this tool is useful for grasping particles of debris.

The overall operation of the debris removal system 20 will now be explained. Initially, the work platform 40 is lowered into position in the spent fuel pool 21 on the racks 25, with the guide fixture 50 disposed in vertical alignment with a selected one of the fuel assembly racks 25. The support stand 60 is then lowered into position on the work platform 40, with the opening 69 in the deflector shield 67 disposed in vertical alignment with the guide fixture 50. Suitable locating pins (not shown) on the work platform 40 may be arranged to cooperate with the support stand 60 to facilitate accurate positioning thereof.

The desired tools, such as tools 200, 210, 220 and 230, are respectively mounted in the tool holder assemblies 170 of the tool manipulation assembly 80.

Then, the entire tool manipulation assembly 80 is lowered into position on the work platform 40, with the forward side of the support frame 81 facing the support stand 60, as illustrated in FIGS. 2 and 3, the locating pins 49 being receivable in complementary openings in the foot channels 85 to facilitate accurate positioning of the tool manipulation assembly 80. Preferably a suitable lifting tool (not shown) is provided for coupling to the support frame 81 for raising and lowering it. This tool will engage the lifting lugs 59 and 91 and has a nose portion which seats in the rig pad 92, securely to brace the lifting tool in position. All of the drive cylinders 95, 127 and 145 are hydraulic cylinders, which may be water driven, and it will be appreciated that before lowering of the tool manipulation assembly 80 into place, all of these drive cylinders are coupled by suitable elongated flexible conduits to an associated source of pressurized water or other suitable drive fluid. Preferably, these drive cylinders will be coupled through associated control valves located at a control console 240 (FIG. 3) disposed at a remote site. Similarly, it will be appreciated that the pressurized water supply is also coupled to the water conduits 213 of the tools 210 and 230 through suitable control valves (not shown), which are also controllable from the remote control site. The cabling for the video camera 135 and any associated lighting therefor will also be coupled to the necessary power and monitoring equipment, which is also located at the remote control console site. All of the necessary electrical and hydraulic connections between the tool manipulation assembly 80 and the control console 240 are diagrammatically designated at 239 in FIG. 3.

When the debris removal system 20 has been mounted in place in the spent fuel pool 21, the fuel assembly 30 to be worked upon is lowered into position over the support stand 60. Generally, the greatest accumulation of debris will be at the lower end of the fuel assembly 30, specifically in the region between the bottom nozzle 38 and the first grid strap 35. Accordingly, the sliding support plate 70 is disposed in its supporting position covering the opening 69 in the deflector shield 67. The fuel assembly 30 is lowered until the bottom nozzle 38 thereof is disposed in its supported position, illustrated in FIG. 8, in engagement with the sliding support plate 70 and centered within the positioning corners 75. In this configuration, the fuel assembly 30 is lightly supported and stabilized by the sliding support plate 70, the primary support for the fuel assembly 30 still being provided by the overhead crane cable 237.

Preferably, the parts of the debris removal system 20 are dimensioned so that when the fuel assembly 30 is seated on the sliding support plate 70, the upper surface 39 of the bottom nozzle 38 will be spaced above the deck 45 approximately the same distance as are the tool holder assembly shafts 172 when the drive assembly 100 is disposed in its lowest position, illustrated in FIG. 10, so that the tools 200-230 can reach as low as the upper surface 39. In a constructional model of the invention, the lift frame 101 is capable of approximately a 3-inch vertical travel in the "Z" direction, so that the tools 200-230 can be moved up substantially to the level of the first grid strap 35 when the fuel assembly 30 is seated on the sliding support plate 70. The lateral frame 120 is capable of approximately a 10-inch travel along the guide shafts 131 and 132 in the "X" direction, for moving the tool mount carriage 160 between the solid line position and the far right broken line position illustrated in FIG. 10. The longitudinal frame 150 is capable of an approximately 11 inch travel along the lateral frame 120 in the "Y" direction between the solid line and broken line positions illustrated in FIG. 11. The fuel assembly 30 is approximately 9 inches square in transverse cross section, and the proximity of the tool manipulation assembly 80 to the support stand 60 and the lengths of the tools 200-300 are such, that the tools 200-230 can reach transversely completely across the fuel assembly 30.

It will be appreciated that the remote operator operates the drive cylinders 95 to effect vertical movement of the tools 200-230, operates the drive cylinder 127 to effect horizontal movement thereof in the "X" direction back and forth alongside the fuel assembly 30, and operates the drive cylinder 145 to effect horizontal movement of the tools 200-230 in the "Y" direction toward and away from the fuel assembly 30. The video camera 135 is oriented so as to afford the most complete view of the region of the fuel assembly 30 being worked on. Preferably, the camera 135 is arranged to provide a view of the entry into the fuel assembly 30 channel spaces between the fuel rods 31, and to see approximately 5 rods deep into the fuel assembly 30. Thus, since the fuel assembly 30 is greater than 5 rods deep, it will be appreciated that in order to obtain effective viewing of operation on all parts of the fuel assembly 30, it may be necessary to rotate the fuel assembly 30 to obtain a clear view of all sides thereof while they are being worked on.

The water lance tools 210 are used to direct either horizontal or downward jets of water at debris particles to dislodge them. Such dislodged particles fall to the upper surface 39 of the bottom nozzle 38, from which they can be brushed by the use of the brush tool 220. The pick tool 200 is also useful for dislodging debris particles, and is particularly useful when debris is wrapped around a fuel rod 31 or grid element. Debris particles which are brushed off the bottom nozzle 38 fall onto the deflector shield 67, and are guided thereby outwardly beyond the perimeter of the support stand 60 and onto the deck 45. The peripheral flange 46 prevents debris from rolling off the edge of the deck 45. This debris can later be removed from the deck 45 by suitable cleaning equipment, either while the work platform is submerged or after it has been removed from the spent fuel pool 21.

While most of the debris accumulates at the lower end of the fuel assembly 30, it may also be necessary to remove debris from upper portions of the fuel assembly 30. To permit access to these upper portions, the fuel assembly 30 is lifted slightly from the support stand 60, permitting the sliding support plate 70 to be slid back to its retracted position, illustrated in broken line in FIG. 7, for uncovering the opening 69 in the deflector shield 67. This movement of the sliding support plate 70 could be effected by a cable or the like secured thereto and operated remotely by suitable drive means (not shown). Once the sliding support plate 70 has been retracted, the fuel assembly 30 can be lowered through the opening 69 in the deflector shield 67, and through the guide fixture 50 into the underlying rack 25 the amount necessary to bring the portion of the fuel assembly 30 to be worked upon within reach of the tool manipulation assembly 80.

It is an important aspect of the present invention that the tool manipulation assembly 80 is arranged so as effectively to prevent damage to the fuel assembly 30 during operation of the debris removal system 20. More particularly, the tool manipulation assembly 80 is designed to prevent any of the tools 200-230 from engaging the fuel assembly 30 with forces sufficient to damage it. This protection is achieved in several ways.

First of all, the drive cylinders 95, 127 and 145 are arranged to limit the maximum motive forces which can be applied thereby to relatively small values. More particularly, the hydraulic pressure is preferably limited so that the forces applied thereby are limited to a few pounds, preferably less than 4 pounds for the horizontal movements. The vertical movement of the drive assembly 100 is counterbalanced by the counterweights 119, so that this movement also can be effected by the exertion of only a few pounds of force by the drive cylinders 95.

To further ensure against the application of damaging forces to the fuel assembly 30, each of the tool holder assemblies 170 comprises a compliant or yieldable mounting for the associated tool which is designed to yield along the axis of the tool holder shafts 172 at a force below the minimum force necessary to damage the fuel assembly 30. This force is determined by the springs 175, which can be changed to set the limiting force as low as 2.5 pounds or as high as 10 pounds, depending upon the application.

Referring in particular to FIGS. 11, 13 and 15, when a tool engages the fuel assembly 30 while being advanced forwardly in the "Y" direction by movement of the longitudinal frame 150 to the left, as viewed in FIG. 11, with a force greater than the biasing force of the spring 175, the spring 175 will yield and compress, allowing the tool holder shaft 172 to retract with respect to the tool mount carriage 160 from its normally extended condition, illustrated in FIG. 11, to a retracted condition, illustrated in solid line in FIG. 15. Thus, the tool will remain motionless with respect to the fuel assembly 30, while the tool mount carriage 160 continues to advance, preventing the force on the fuel assembly 30 from building up past the yield point of the spring 175.

As the tool holder shaft 172 is retracted, the shoulder screw 185 moves the strap 184 (or 188) in a retracting direction (to the right, as viewed in FIG. 15) until the actuator pin 187 (or 189) engages the switch lever 183 for actuating the limit switch 182 to generate the alarm signal. Preferably, the length of the slot 169 in the turret plate arm 162 is such that when the switch 182 is actuated, there is still clearance between the shoulder screw 185 and the end of the slot 169 (see FIG. 15). This permits the advance of the longitudinal frame 150 to be terminated, either manually or automatically, before the shoulder screw 185 bottoms out in the slot 169, thereby ensuring that the force exerted on the fuel assembly 30 will not increase past the yield point of the spring 175. The longitudinal frame 150 can then be retracted and the drive assembly 100 repositioned to avoid the offending contact with the fuel assembly 30.

Preferably, the plunger fittings 158 are also designed so that the tool mount carriage 160 can be rotated from one of its work configurations with the exertion of only a few pounds of force. Thus, in the event that the fuel assembly 30 should be side loaded by a tool, as during movement of the lateral frame 120 in the "X" direction, the tool mount carriage 160 can rotate to avoid overloading of the fuel assembly 30.

It is another feature of the present invention that the tool mount carriage 160 can be selectively moved to place different tools into a work configuration, without having to remove the entire tool manipulation assembly 80 from the spent fuel pool 21. When it is desired to change the tool being used, the drive assembly 100 is operated to move the tool mount carriage 160 to the center position, illustrated in broken line in FIG. 10, wherein the hex stud 179 is positioned immediately beneath the funnel 93 in vertical alignment therewith. A suitable tool such as a lug wrench may then be lowered manually through the spent fuel pool 21, as with an elongated rod, for insertion through the funnel 93 and into engagement with the hex stud 179 to rotate the tool mount carriage 160. In this regard, the tool mount carriage 160 will tend to snap into each of its work configurations by engagement of the plunger pins 159 in the recesses 161a, so that the operator will be able to tell when the tool mount carriage is accurately positioned in a work configuration.

It will also be appreciated that, if it is necessary to change the tools on the tool mount carriage 160, such as to provide a different set of tools for performing a different type of operation, or to replace damaged or worn tools or the like, this can be effected by removal of only the tool manipulation assembly 80 from the spend fuel pool 21, without having to disturb the support stand 60 or the work platform 40.

In an operational model of the present invention, the support frame 81 is preferably formed of aluminum for light weight, while the remaining parts of the tool manipulation assembly 80, as well as the work platform 40 and the support stand 60, are preferably formed of stainless steel. the support frame 81 is approximately 3 feet long, by approximately 2 feet high, by approximately 1½ feet wide, although it will be appreciated that the dimensions of the debris removal system 20 can be changed as needed, depending upon the particular application.

While the debris removal system 20 has been described in connection with the removal of debris from a nuclear fuel assembly 30, it will be appreciated that it could be utilized for other purposes. Thus, other tools, such as various types of transducers or sensors, could be mounted on the tool mount carriage 160 for performing other operations, such as measurement, inspection, repair or the like, on the fuel assembly 30. Also, while the system 20 has been described for use in operating on a fuel assembly 30, it could be utilized in other applications in a nuclear fuel plant, such as for use in dissecting a rubbled core.

From the foregoing, it can be seen that there has been provided an improved system for removing debris from a nuclear fuel assembly, the system permitting remote manipulation of a plurality of tools to minimize man-rem exposure, the system being characterized by the accurate manipulation of the tools with minimal forces and effectively preventing the application of damaging forces to the associated fuel assembly.

We claim as our invention:

1. Apparatus for manipulating tools with respect to a nuclear fuel assembly at a work station, said apparatus comprising: a transportable support movable to and from a work position at the work station adjacent to the nuclear fuel assembly, said support including frame means defining an encompassed space, a tool carriage mounted on said support and disposed in said encompassed space, a plurality of tools mounted on said tool carriage, said tool carriage including selection means accommodating disposition of a selected one of said tools in a work configuration with respect to the associated nuclear fuel assembly, motive means on said support for effecting movement of said tool carriage and the tools carried thereby with respect to said frame means within said encompassed space along either of two orthogonal axes and movement of the selected tool along a third axis with respect to said frame means orthogonal to said first two axes for performing work with respect to the nuclear fuel assembly, and control means for remotely controlling operation of said manipulation means.

2. The apparatus of claim 1, wherein said tool carriage is mounted for rotational movement for selectively positioning said tools in said work configuration.

3. The apparatus of claim 2, wherein said tool carriage is rotatable about an axis disposed substantially vertically in use.

4. The apparatus of claim 1, wherein said motive means includes fluid drive means for effecting movement along said axes.

5. The apparatus of claim 1, wherein said tool carriage supports four of said tools.

6. The apparatus of claim 1, wherein said tools are designed for removing debris from the nuclear fuel assembly.

7. The apparatus of claim 6, wherein said tools include a pick, and a fluid lance, and a brush, and a tweezer.

8. The apparatus of claim 1, and further including video camera means carried by said support for remote viewing of the nuclear fuel assembly and the work performed thereon.

9. The apparatus of claim 1, wherein said tool carriage includes means for mounting each of said tools for movement with respect to said tool carriage, and means biasing each said tool toward a predetermined position.

10. Apparatus for manipulating a tool with respect to a nuclear fuel assembly at a work station, said apparatus comprising: a tool carriage, a tool holder for holding an associated tool, said tool holder being mounted on said tool carriage for reciprocating movement with respect thereto along a predetermined axis between extended and retracted conditions, yieldable means resiliently urging said tool holder to its extended condition with a predetermined force less than the minimum force which could damage the associated nuclear fuel assembly, drive means for effecting reciprocating movement of said tool carriage along said axis for manipulating said tool holder and the tool held thereby to perform work with respect to the associated nuclear fuel assembly, whereby engagement of the nuclear fuel assembly by the tool with a force in excess of said predetermined force in response to movement of said tool carriage toward the nuclear fuel assembly causes said tool holder to move from its extended condition toward its retracted condition with respect to said tool carriage, and means responsive to movement of said tool holder a predetermined distance along said axis from its extended condition toward its retracted condition for generating a signal.

11. The apparatus of claim 10, wherein said yieldable means includes a helical compression spring.

12. The apparatus of claim 10, wherein said drive means includes means for effecting reciprocating movement of said tool carriage along any of three orthogonal axes.

13. The apparatus of claim 12, and further including resilient means yieldable in response to engagement of the nuclear fuel assembly by the tool with a force in a direction other than along said predetermined axis.

14. The apparatus of claim 10, and further including video camera means carried by said drive means for remote viewing of the nuclear fuel assembly and the work performed thereon.

15. The apparatus of claim 10, and further including a plurality of said tool holders for respectively holding a plurality of associated tools, said tool holders being mounted on said tool carriage for reciprocating movement with respect thereto respectively along a plurality of predetermined axes between extended and retracted conditions.

16. The apparatus of claim 15, wherein said tool carriage includes selection means accommodating disposition of a selected one of said tools in a work configuration with respect to the associated nuclear fuel assembly.

17. A system for working on an elongated nuclear fuel assembly suspended vertically and submerged in a spent fuel pool having a plurality of fuel assembly racks at the bottom thereof, said system comprising: a work platform disposable in the pool and adapted to be supported on the fuel assembly racks, said platform having an opening therein disposed in registry with a selected one of the underlying racks; guide means carried by said platform for guiding the suspended fuel assembly into said opening and the selected rack to accommodate vertical movement of the fuel assembly into and out of the rack to make different portions of the fuel assembly accessible from said platform; and tool manipulating apparatus disposable on said platform adjacent to said opening, said tool manipulating apparatus including a tool carriage, a plurality of tools mounted on said tool carriage, said tool carriage including selection means accommodating dispostition of a selected one of said tools in a work configuration with respect to the associated fuel assembly, motive means for effecting movement of said tool carriage and the selected tool along any of three orthogonal axes for performing work with respect to the fuel assembly, and control means for remotely controlling operation of said motive means.

18. The system of claim 17, wherein said tools are designed for removal of debris from the fuel assembly.

19. The system of claim 18, and further including shield means disposed in surrounding relationship with said opening and engageable with the nuclear fuel assembly during vertical movement thereof for directing loose debris onto said platform and preventing it from falling through said opening and into the associated rack.

20. The system of claim 17, and further including a support stand mounted on said platform for stabilizing the fuel assembly when it is supported over said opening.

21. The system of claim 20, wherein said support stand includes a support plate movable between a supporting position overlying said opening for supporting relationship with the lower end of the fuel assembly, and a retracted position withdrawn from said opening for accomodating vertical movement of the fuel assembly into and out of the associated rack.

22. The system of claim 20, wherein said support stand is transportable to and from a support location on said work platform.

23. The system of claim 17, wherein said tool manipulating apparatus is transportable to and from a work position on said work platform.

24. A system for working on an elongated nuclear fuel assembly suspended vertically and submerged in a spent fuel pool having a plurality of fuel assembly racks at the bottom thereof, said system comprising: a work platform disposable in the pool and adapted to be supported on the fuel assembly racks, said platform having an opening therein disposed in registry with a selected one of the underlying racks; guide means carried by said platform for guiding the suspended fuel assembly into said opening and the selected rack to accommodate vertical movement of the fuel assembly into and out of the rack to make different portions of the fuel assembly accessible from said platform; and tool manipulating apparatus disposable on said platform adjacent to said opening, said tool manipulating apparatus including a tool carriage, a plurality of tool holders for respectively holding a plurality of associated tools, each of said tool holders being mounted on said tool carriage for reciprocating movement with respect thereto along a predetermined axis between extended and retracted conditions, said tool carriage including selection means accommodating disposition of a selected one of said tool holders in a work configuration with respect to the associated fuel assembly, motive means for effecting movement of said tool carriage along any of three orthogonal axes including said predetermined axis for performing work with respect to the fuel assembly, yieldable means resiliently urging each of said tool holders to its extended condition with a predetermined force less than the minimum force which could damage the associated fuel assembly, whereby engagement of the fuel assembly by a tool with a force in excess of said predetermined force in response to movement of said tool carriage toward the fuel assembly along said predetermined axis causes said tool holder to move from its extended condition toward its retracted condition with respect to said tool carriage, and control means for remotely controlling operation of said motive means, said control means including means responsive to said movement of said tool holder a predetermined distance along said axis from its extended condition toward its retracted condition for generating a signal.

25. The system of claim 24, wherein said tool manipulating apparatus includes counterweight means for counterbalancing said apparatus during movement thereof along a vertical axis.

26. The system of claim 24, wherein said tool carriage further includes resilient means yieldable in response to engagement of the nuclear fuel assembly by the tool with a force in a direction other than along said predetermined axis.

* * * * *